(No Model.)
E. G. KEMPER.
STONE SAW.
No. 356,136. Patented Jan. 18, 1887.
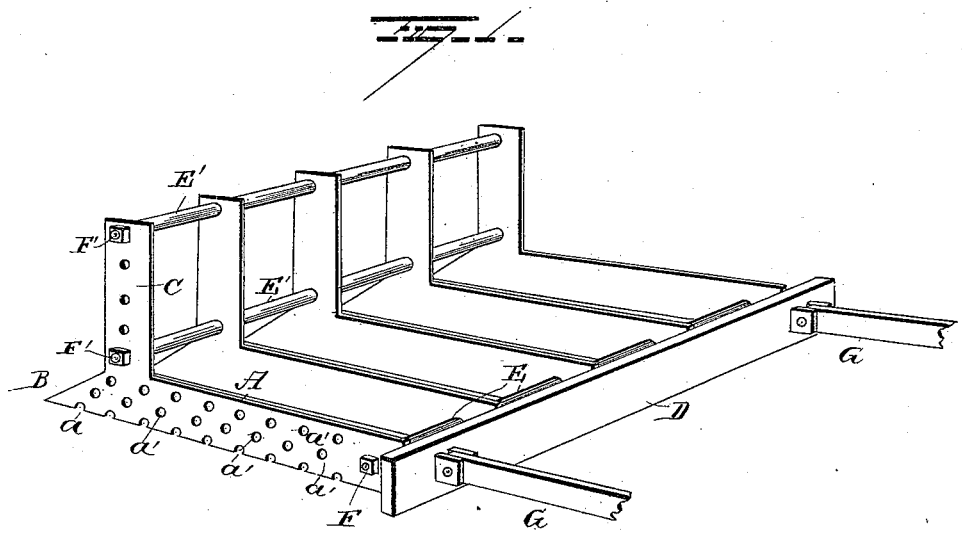
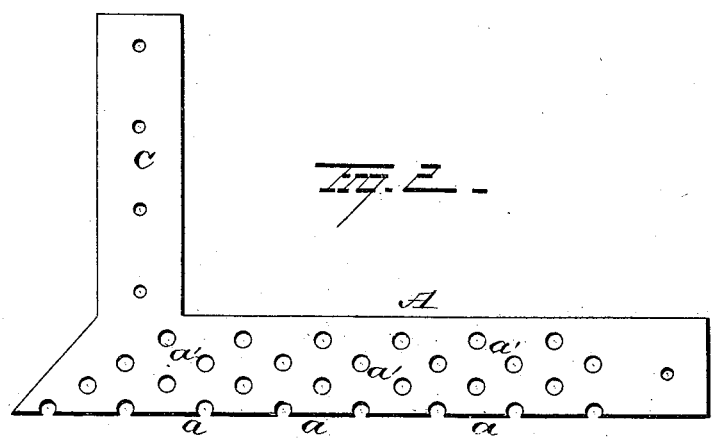
WITNESSES
Geo. F. Downing
S. G. Nottingham
INVENTOR
E. G. Kemper
By H. A. Simpson
Attorney

UNITED STATES PATENT OFFICE.

ERNEST G. KEMPER, OF BURLINGTON, IOWA.

STONE-SAW.

SPECIFICATION forming part of Letters Patent No. 356,136, dated January 18, 1887.

Application filed September 2, 1886. Serial No. 212,512. (No model.)

*To all whom it may concern:*

Be it known that I, ERNEST G. KEMPER, of Burlington, in the county of Des Moines and State of Iowa, have invented certain new and useful Improvements in Stone-Saws; and I do hereby declare the following to be a full, clear, and exact description of the invention, such as will enable others skilled in the art to which it appertains to make and use the same.

My invention relates to an improvement in stone-saws.

The object is to provide a saw or gang of saws which will cut into the faces of the solid rock as it lies in a quarry, thereby preventing the waste which inevitably occurs in blasting out irregular masses of stone, and subsequently sawing it into slabs.

With this end in view my invention consists in certain features of construction and combination of parts, as will be hereinafter described, and pointed out in the claims.

In the accompanying drawings, Figure 1 is a view of a gang of saws as they appear at work, and Fig. 2 is a view of one of the saws detached.

A represents one of the saw-blades. It is provided with a set of teeth or cutters, *a*, on its lower edge, formed by perforations *a'* alternating in horizontal series, and is further provided at its end toward the mass of rock or its free end with a sharp projection, B, to insure its clearance. The lower edge of the projection B is on a line and flush with the points of the teeth or cutters, and its upper edge slants at an angle of about forty-five degrees to its lower edge. When the blade becomes worn beyond the first or lowest line of perforations, the second line will open up.

An upright plate or strip of metal, C, is firmly secured to the free end of the blade A and extends at right angles thereto. The plate or strip C is preferably formed integral with the blade A, since such a construction insures stiffness and more readily affords a uniform thickness at the angle. The projection B extends four inches (more or less) beyond the edge of the plate C.

The saw-blades as above constructed are attached to a head, D, (preferably in gangs,) in any desired manner, the accompanying drawings representing a gang of five. They are held firmly at the proper distance apart by tube-sections E, (common gas-pipe serves the purpose well,) one or more rods, F, provided with suitable draw-nuts at the ends, extending through the blades and spacing-tubes near the head D, and serving to draw the blades and spacing-tubes into snug contact with each other. Two or more similar rods, F', and spacing-tubes E' serve to hold the plates C and hence the free ends of the saws the same distances apart as the head ends are held.

The plates or strips C afford means for weighting the free ends of the saws, and by furnishing the said plates or strips C with series of perforations a short distance apart the guiding and spacing rods may be shifted to a higher position as the blades enter the bed of rock until the required depth has been reached.

G G represent pitmen attached to the head D for transmitting power to the saw. The saws are operated to advantage where the bed of rock has a face nearly or quite perpendicular, or nearly or quite at right angles, to the surface on which the saws are placed to begin their cut. The saws cut their way down into the bed of rock, their free ends being firmly held at the proper distance apart by the tie-rods and spacing-sections, and weighted to make the cut as rapid as desirable. The construction and arrangement of the whole are simple and inexpensive, and meet a long-felt want.

It is evident that slight changes might be resorted to in the form and arrangement of the several parts described without departing from the spirit and scope of my invention. Hence I do not wish to limit myself to the construction herein set forth; but, Having fully described my invention, what I claim as new, and desire to secure by Letters Patent, is—

1. A stone-saw provided with a guide-plate attached to its free end and extending at right angles to the blade, substantially as set forth.

2. A stone-saw provided with a guide-plate attached to its free end and extending at right angles to the saw-blade, and further provided with a sharp projection at its free end to insure clearance, substantially as set forth.

3. The combination, with two or more stone-saws, each provided with a guide-plate rigidly secured thereto, of a tie-rod adapted to extend transversely through the several saw-blades, and tube-sections located on the rod between the blades adapted to hold them at the desired distance apart, substantially as set forth.

4. The combination, with a gang of stone-saws, each provided with a guide-plate rigidly secured thereto and connected to the operating-head, of one or more tie-rods provided with spacing-sections adapted to hold the head ends the proper distances apart, and one or more tie-rods provided with spacing-sections adapted to hold the guide-plates and hence the free ends of the saws the proper distance apart, substantially as set forth.

5. A stone-saw blade having a guide-plate rigidly secured to the free end thereof and provided with perforations, arranged substantially as described.

In testimony whereof I have signed this specification in the presence of two subscribing witnesses.

ERNEST G. KEMPER.

Witnesses:
CHAS. B. BERSHEE,
JNO. C. GREINER.